(12) United States Patent
Yin et al.

(10) Patent No.: US 9,075,579 B2
(45) Date of Patent: Jul. 7, 2015

(54) MOUNTING APPARATUS FOR EXPANSION CARD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Xiao-Gang Yin, Shenzhen (CN); Jun-Hui Wang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 122 days.

(21) Appl. No.: 13/945,916

(22) Filed: Jul. 19, 2013

(65) Prior Publication Data

US 2015/0003001 A1    Jan. 1, 2015

(30) Foreign Application Priority Data

Jun. 26, 2013  (CN) .......................... 2013102587720

(51) Int. Cl.
  *G06F 1/16*  (2006.01)
  *G06F 1/18*  (2006.01)
(52) U.S. Cl.
  CPC ...................... *G06F 1/186* (2013.01)

(58) Field of Classification Search
  USPC ..................................... 361/679.32
  See application file for complete search history.

(56) References Cited

U.S. PATENT DOCUMENTS

| 5,947,571 A * | 9/1999 | Ho .............................. 312/265.6 |
| 5,963,431 A * | 10/1999 | Stancil ......................... 361/803 |
| 2009/0002960 A1* | 1/2009 | Liu et al. ...................... 361/759 |
| 2009/0129002 A1* | 5/2009 | Wu et al. ...................... 361/679.4 |
| 2011/0122569 A1* | 5/2011 | Chang et al. ............. 361/679.43 |
| 2012/0155007 A1* | 6/2012 | Zhang et al. ............. 361/679.32 |

* cited by examiner

Primary Examiner — Adrian S Wilson
(74) Attorney, Agent, or Firm — Novak Druce Connolly Bove + Quigg LLP

(57) ABSTRACT

A mounting apparatus for an expansion card includes a bracket, a circuit board mounted in the bracket, and a latching member. The bracket includes a bottom wall, a supporting wall perpendicularly mounted on the bottom wall, and a first end wall and a second end wall extending from two opposite ends of the supporting wall along the same direction. The circuit board includes a connector. The latching member includes a first hook and a mounting piece. The latching member is slidably installed to the first end wall. The mounting piece is exposed out of the bottom wall of the bracket. The expansion card is inserted into the connector of the circuit board, a front end of the expansion card is mounted to the second end wall, and a rear end of the expansion card is latched to the first hook of the latching member.

8 Claims, 5 Drawing Sheets

MOUNTING APPARATUS FOR EXPANSION CARD

BACKGROUND

1. Technical Field

The disclosure relates to an apparatus for mounting a plurality of expansion cards.

2. Description of Related Art

Typical types of expansion cards, such as network cards, sound cards, graphics accelerator cards, and multi-media cards, are installed in a computer enclosure by a mounting mechanism. However, the mounting mechanism only secures one end of the expansion card to the computer enclosure. If the expansion card is long, the mounting mechanism may not stably secure the expansion card in the computer enclosure.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

Figure 1:
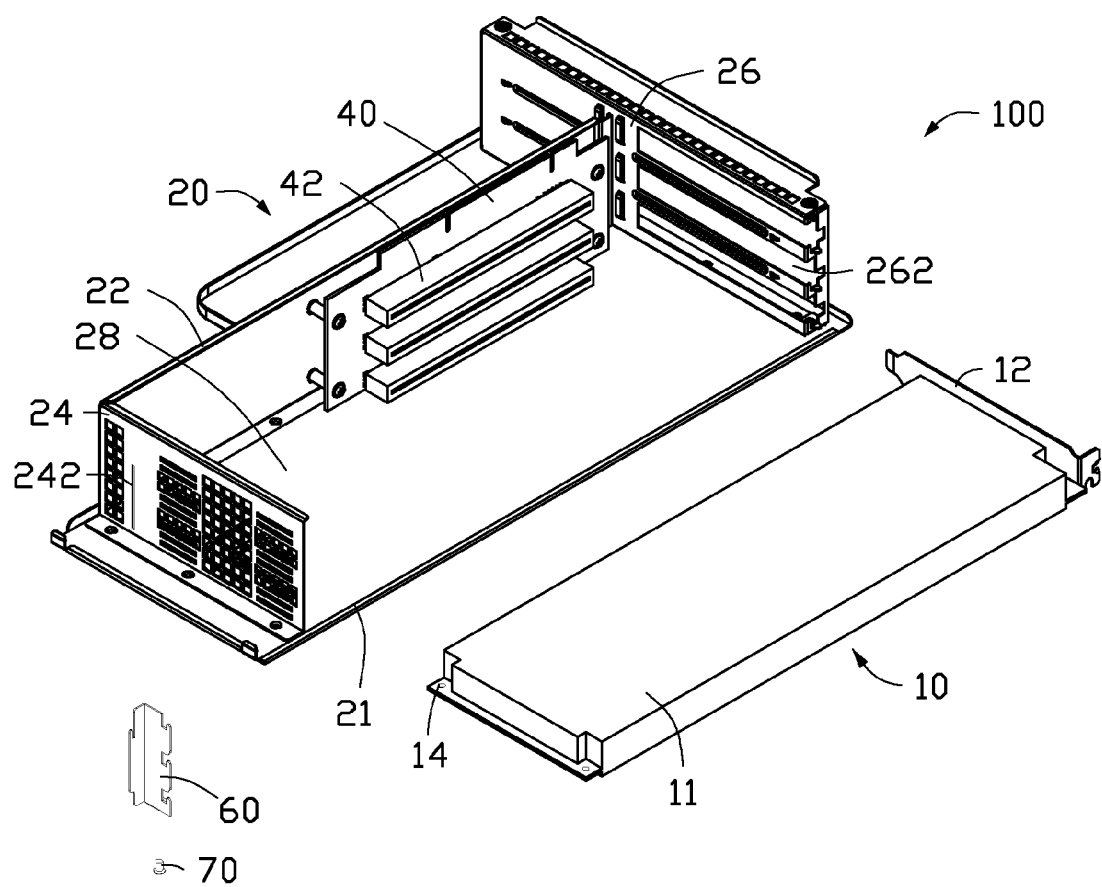
FIG. 1 is an exploded, isometric view of an embodiment of a mounting apparatus with an expansion card, wherein the mounting apparatus includes a latching member.
Figure 2:
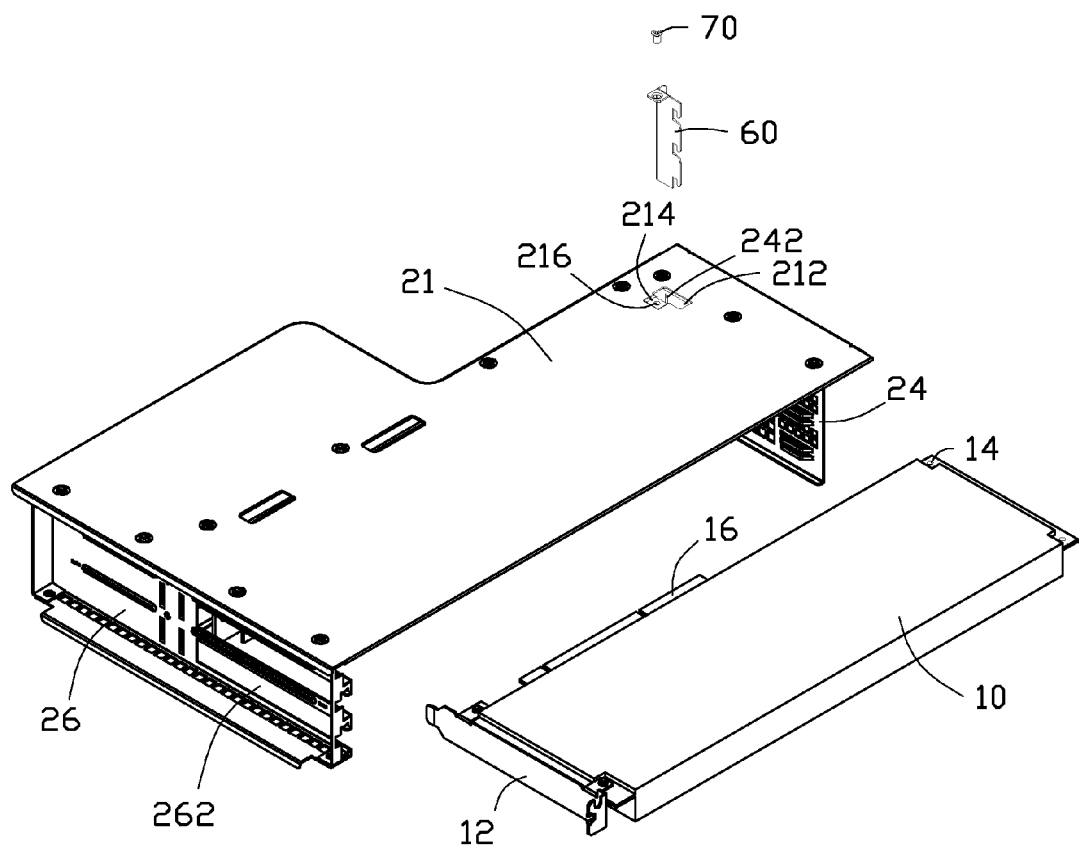
FIG. 2 is an inverted view of FIG. 1.

FIG. 1 and FIG. 2 show a mounting apparatus 100 for an expansion card 10. The mounting apparatus 100 includes a bracket 20, a circuit board 40, a latching member 60, and a fastener 70.

The expansion card 10 includes a rectangular circuit board 11 and a substantially L-shaped covering piece 12 mounted to a front end of the circuit board 11. A rear end of the circuit board 11 defines two positioning holes 14. A connection portion 16 extends out from a side of the circuit board 11.

The bracket 20 includes a bottom wall 21, a rectangular supporting wall 22 perpendicularly extending up from a side of the bottom wall 21, a first end wall 24 perpendicularly extending from a rear end of the supporting wall 22, and a second end wall 26 perpendicularly extending from a front end of the supporting wall 22. The first end wall 24 and the second end wall 26 extend along a same direction and are perpendicularly mounted to the bottom wall 21. The bottom wall 21, the supporting wall 22, the first end wall 24, and the second end wall 26 cooperatively bound a receiving space 28. An end of the first end wall 24 adjacent to the supporting wall 22 defines a slide slot 242 parallel to the supporting wall 22. The second end wall 26 defines a plurality of slots 262 perpendicular to the supporting wall 22. The bottom wall 21 defines a through hole 212 adjacent to the slide slot 242 of the first end wall 24. A bottom surface of the bottom wall 21 adjacent to a side of the through hole 212 is depressed to form an indentation 214. The indentation 214 communicates with the through hole 212. A bottom wall of the indentation 214 defines a mounting hole 216.

The circuit board 40 is received in the receiving space 28 and mounted to the supporting wall 22. A plurality of connectors 42 is mounted to a surface of the circuit board 40 opposite to the supporting wall 22.

Figure 3:
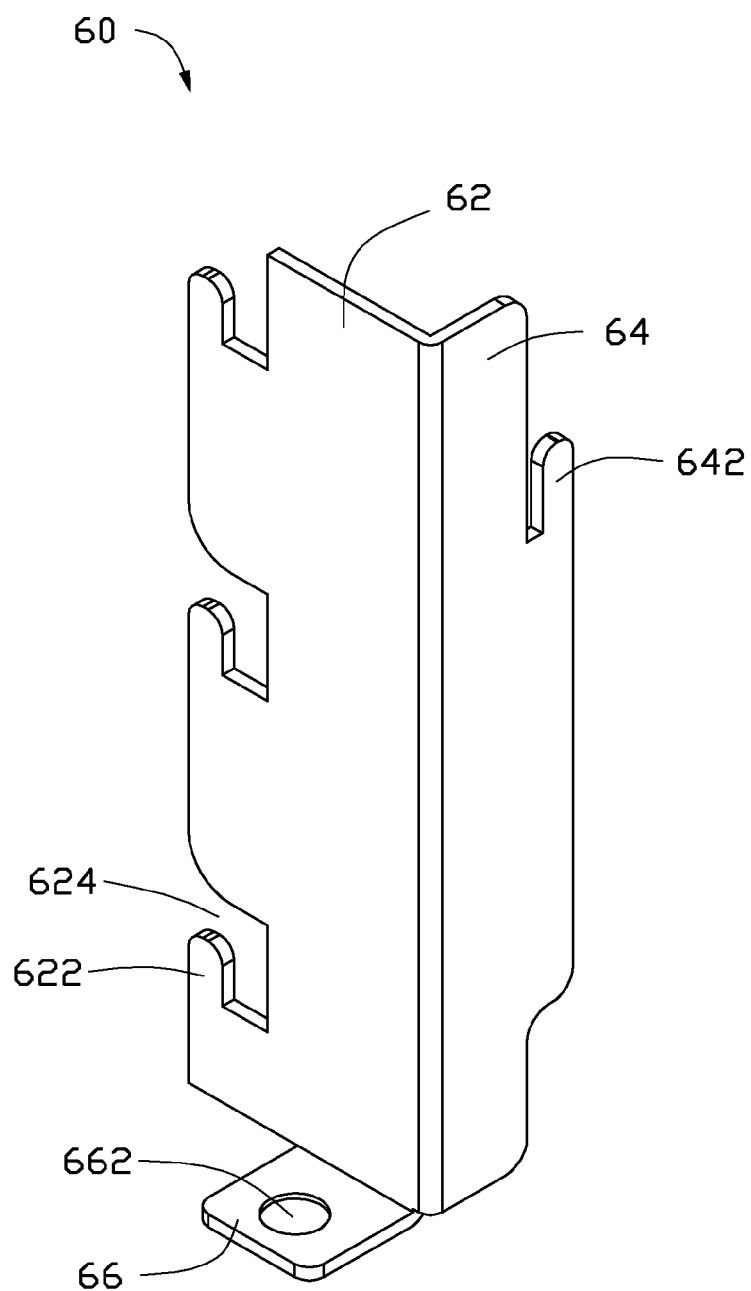
FIG. 3 is an enlarged view of the latching member of FIG. 1, but viewed from another perspective.

FIG. 3 shows the latching member 60 including a rectangular latching plate 62, a sliding plate 64 perpendicularly extending out from a first side of the latching plate 62, and a mounting piece 66 perpendicularly extending from a bottom end of the latching plate 62 and extending away from the sliding plate 64. A plurality of first hooks 622 is formed at a second side of the latching plate 62 opposite to the sliding plate 64. The latching plate 62 defines a receiving slot 624 above each hook 622. A second hook 642 is formed at a side of the sliding plate 64 opposite to the latching plate 62 and extends away from the mounting piece 66. The mounting piece 66 defines a through hole 662.

Figure 4:
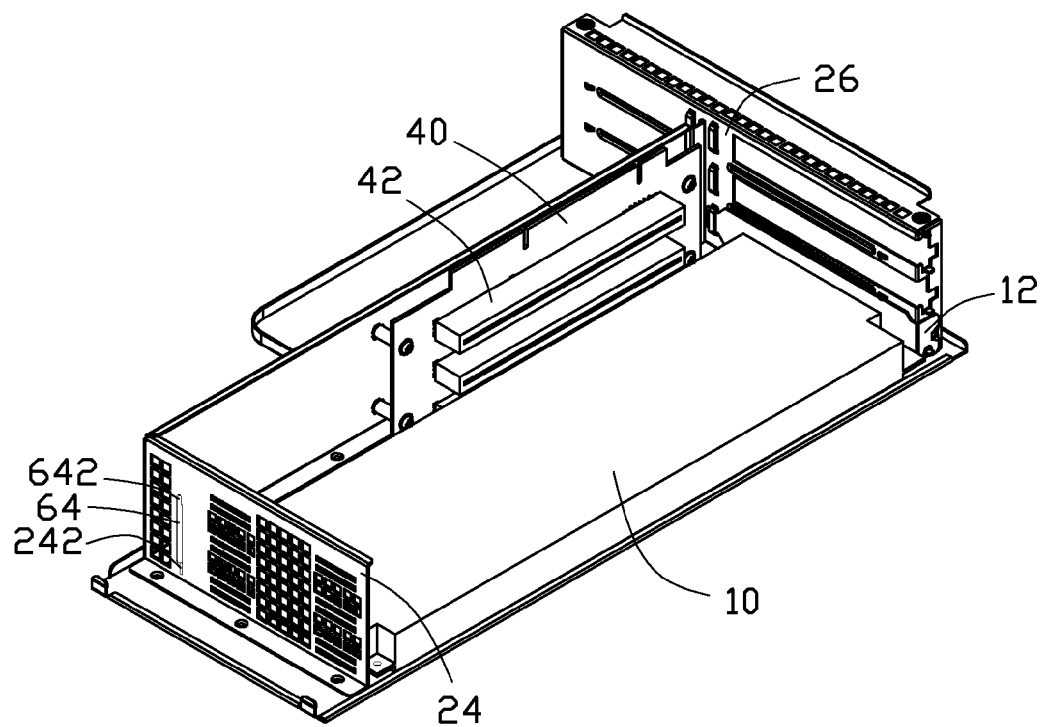
FIG. 4 is an assembled, isometric view of FIG. 1.
Figure 5:
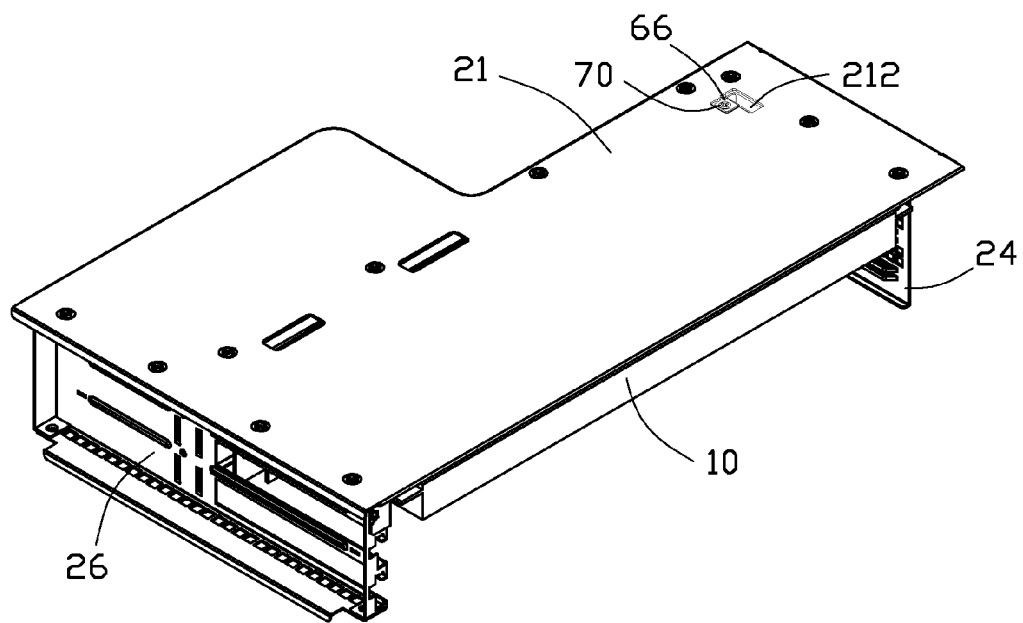
FIG. 5 is an assembled, isometric view of FIG. 2.

FIGS. 4 and 5 show that in assembly, a top end of the latching member 60 opposite to the mounting piece 66 is inserted into the through hole 212 from the bottom surface of the bottom wall 21. The sliding plate 64 is slidably received in the slide slot 242 of the first end wall 24, until the mounting piece 66 is received in the indentation 214 of the bottom wall 21. The second hook 642 latches to a top wall bounding the slide slot 242.

In assembling the expansion card 10 to the mounting apparatus 100, the latching member 60 is pressed down, to allow the second hook 642 to be detached from the top wall bounding the slide slot 242. The expansion card 10 is inserted in the receiving space 28 of the bracket 20 and slid along the slots 262 of the second end wall 26, until the connection portion 16 is connected to one of the connectors 42. The covering piece 12 is received in a corresponding one of the slots 26, to allow the front end of the expansion card 10 to be mounted to the second end wall 26. The rear end of the circuit board 11 is received in the corresponding receiving slot 624 of the latching member 60, and the corresponding first hook 622 aligns with the corresponding positioning hole 14 of the expansion card 10. The latching member 60 is moved up along the slide slot 242, so that the first hook 622 engages in the positioning hole 14 of the expansion card 10. The second hook 642 latches to the top wall bounding the slide slot 242. The fastener 70 extends through the through hole 662 of the mounting piece 66, to be latched in the mounting hole 216 of the indentation 214. Therefore, the rear end of the expansion card 10 is mounted to the latching member 60. The covering piece 12 is retained in the corresponding slot 262 by any suitable conventional fixing apparatus. Thus, the expansion card 10 is securely attached in the bracket 20.

It is to be understood, however, that even though numerous characteristics and advantages of certain embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A mounting apparatus for an expansion card, the mounting apparatus comprising:

a bracket comprising a bottom wall, a supporting wall perpendicularly extending up from the bottom wall, and a first end wall and a second end wall extending from two opposite ends of the bottom wall along a same direction;

a circuit board mounted on an inner surface of the supporting wall facing the first and second end walls, and comprising a connector opposite to the supporting wall; and a latching member comprising a latching plate, a sliding plate extending from the latching plate, and a mounting piece extending from the latching plate, the latching plate forming a first hook;

wherein the sliding plate is slidably installed to the first end wall, the mounting piece is exposed out of the bracket through the bottom wall of the bracket and is located at a bottom of the bottom wall, and when mounting the expansion card, the expansion card is connected to the connector of the circuit board, a front end of the expansion card is mounted to the second end wall, and a rear end of the expansion card is latched to the first hook of the latching member.

2. The mounting apparatus of claim 1, wherein the sliding plate extends out from a side of the latching plate, the mounting piece extends from a bottom end of the latching plate, the first hook is formed at a side of the latching plate opposite to the sliding plate.

3. The mounting apparatus of claim 2, wherein the latching plate defines a receiving slot above the first hook, the rear end of the expansion card is received in the receiving slot.

4. The mounting apparatus of claim 2, wherein the first end wall defines a slide slot perpendicular to a sliding direction of the expansion card, the sliding plate is slidably received in the slide slot of the first end wall.

5. The mounting apparatus of claim 4, wherein the bottom wall defines a through hole adjacent to the slide slot of the first end wall, the latching member is inserted in the bracket through the through hole.

6. The mounting apparatus of claim 5, wherein a bottom surface of the bottom wall is depressed to form an indentation communicating with the through hole, the mounting piece of the latching member is mounted in the indentation.

7. The mounting apparatus of claim 6, wherein a bottom wall of the indentation defines a mounting hole, the mounting piece of the latching member defines a through hole, a fastener extends through the through hole of the mounting piece and is fixed in the mounting hole.

8. The mounting apparatus of claim 4, wherein a second hook is formed at a side of the sliding plate opposite to the latching plate, the second hook detachably latches to a top wall bounding the slide slot.

\* \* \* \* \*